(12) United States Patent
Seto et al.

(10) Patent No.: US 7,330,590 B2
(45) Date of Patent: Feb. 12, 2008

(54) PEN OUT-OF-PROXIMITY HANDWRITING-RECOGNITION TRIGGER

(75) Inventors: Tetsuo Seto, Bellevue, WA (US); Takanobu Murayama, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 112 days.

(21) Appl. No.: 11/357,315

(22) Filed: Feb. 17, 2006

(65) Prior Publication Data

US 2006/0140480 A1 Jun. 29, 2006

Related U.S. Application Data

(63) Continuation of application No. 10/071,306, filed on Feb. 8, 2002, now Pat. No. 7,027,648.

(51) Int. Cl.
*G06K 9/00* (2006.01)
*G06F 3/033* (2006.01)

(52) U.S. Cl. .................... 382/187; 345/179

(58) Field of Classification Search ........ 382/187–189, 382/202, 314, 181; 178/18.01, 18.03, 19.01; 345/156, 179
See application file for complete search history.

(56) References Cited

U.S. PATENT DOCUMENTS

| | | | |
|---|---|---|---|
| 5,347,295 A | 9/1994 | Agulnick et al. | |
| 5,633,952 A | 5/1997 | Outa et al. | |
| 5,848,187 A | 12/1998 | Bricklin et al. | |
| 5,926,567 A | 7/1999 | Collins et al. | |
| 5,991,441 A | 11/1999 | Jourjine | |

OTHER PUBLICATIONS

Souya, Toshio et al., A Basic Design of Handwriting User Interface with Lazy Recognition, Jan. 1993, pp. 158-166, vol. 34, No. 1, Tokyo University of Agriculture and Technology, Japan.
Tappert, Charles C. et al., The State of the Art in On-Line Handwriting Recognition, IEEE Transactions on Pattern Analysis and Machine Intelligence, Aug. 1990, pp. 787-808, vol. 12, No. 8.
Leung, Wing-Nin et al., An On-Line Handwritten Chine Character Recognition System Based on Relative Strokes Positions and Artificial Neural Networks, 1995, Hong Kong Polytechnic University, Hong Kong.

*Primary Examiner*—Daniel Mariam
(74) *Attorney, Agent, or Firm*—Banner & Witcoff, Ltd.

(57) ABSTRACT

In a computer system that accepts handwritten input, a digitizer tracks the location of a user's pen while the pen is not in contact with the digitizer's writing surface. The digitizer maps the pen's three-dimensional location into a two-dimensional location on the digitizer's writing surface. Handwriting-recognition is triggered for handwriting entered into a handwriting-recognition task area upon detecting that the user has lifted the pen off of the digitizer's writing surface and that the pen has moved out of proximity from the handwriting-recognition task area. The handwriting-recognition triggering may be inhibited when the pen is down and in contact with the digitizer's writing surface in an inking orientation.

11 Claims, 6 Drawing Sheets

PEN OUT-OF-PROXIMITY HANDWRITING-RECOGNITION TRIGGER

This application is a continuation of and claims priority to U.S. application Ser. No. 10/071,306 filed Feb. 8, 2002 (now U.S. Pat. No. 7,027,648). The prior application is hereby incorporated by reference in its entirety.

FIELD OF THE INVENTION

This invention relates generally to computer user interfaces that accept handwritten input and more particularly to triggering recognition of the handwritten input upon determining that to the user is finished writing in a handwriting-recognition task area.

BACKGROUND OF THE INVENTION

The faster handwriting-recognition results are returned, the better a user's experience will be. Conventional handwriting-recognition techniques typically have a fundamental bottleneck in detecting when the user finishes writing. This bottleneck often undesirably delays triggering the handwriting-recognition process.

Conventional ways for detecting that a user has finished writing and that handwriting recognition should be triggered typically include one or more of the following three techniques.

First, a timer is set upon detecting that the user has lifted the pen off the handwriting-recognition surface, which be referred to as a pen-up event. If a pen-down event, which occurs when a user places the pen on the handwriting-recognition surface, is not detected before the timer expires, it is inferred that the user has finished writing.

Second, if the user touches outside of a current handwriting-recognition-task area or inside a next task area, the pen-down event is interpreted as completion of the handwriting to be recognized from the current task area.

Third, if the user presses a soft key, labeled "End" or the like, the button-pressed event is interpreted as an indication from the user that the user is finished writing and that recognition should be triggered.

These three conventional techniques for determining when a user has stopped writing in a handwriting-recognition-task area have various shortcomings.

For the first technique, preferred timer values can vary from user to user depending on the users' writing speeds. Shorter timer values can cause a significant usability problem because, for a slow writer, timeouts may undesirably occur when the user hasn't finished writing yet. Some systems allow the user to set the value. The timer value usually is set to a value between 1 and 3 seconds. Since a user's writing speed can change dynamically, the fixed timer value may not work well under certain conditions. If the value is set to 3 seconds for example, the typical frustration of the handwriting recognition being triggered too early can be avoided, but the writing experience can be tedious because the user has to wait a relatively long time for recognition to be triggered.

With no automatic timers, the "End"-button approach does not present problems related to triggering recognition before or after recognition is desired. A shortcoming of the "End"-button approach, though, is that it reduces the quality of the user's experience by requiring many button presses. The repeated hand movement associated with these button presses gets tiresome, represents a significant overhead from the user's point of view, and disturbs the user's train of thought in composing sentences.

For the third technique discussed above, recognition is triggered for handwriting in a current task area when the user starts writing in a next task area. Although this technique works reasonably well, it does not take advantage of the time between when the user lifts the pen from the current task area and when the user puts the pen down in the next task area. Further, once the pen-down event has occurred, the user is typically already focused on writing in the next task area. The user may therefore ignore any recognition results provided for the handwriting entered in the previous task area. For any of the foregoing reasons, triggering handwriting recognition for a previous handwriting-recognition task area while the user moves the pen from the previous task area to a new task area would be desirable.

SUMMARY

In accordance with embodiments of the invention, as a user removes the pen from a previous task area, it is inferred that the user has finished writing in that task area and the handwriting-recognition process is triggered. Triggering handwriting recognition in this way may be referred to as out-of-proximity handwriting-recognition triggering.

An out-of-proximity trigger in accordance with embodiments of the invention advantageously uses the time while a user's pen is being moved from a previous task area to a next task area. This triggering in accordance with the invention can work well regardless of how quickly a user writes. When the user writes quickly, the user's quick hand movement causes the trigger to occur quickly. If the user writes slowly, the user's slow hand movement causes the trigger to occur slowly.

An out-of-proximity trigger in accordance with embodiments of the invention may trigger handwriting based on the user lifting the pen and moving the pen to a next task area, which is part of the natural flow of writing. The user may therefore concentrate on writing without being distracted by any need to periodically press a button to manually trigger handwriting recognition. In addition, since the handwriting-recognition result can be displayed before the user starts writing in the next task area, the user may receive recognition results before focusing on the next task area.

The pen's location may be tracked while the pen is up in a non-inking position and while it is separated from an inking surface by a distance that is greater than zero and less than or equal to a maximum trackable distance. The out-of-proximity trigger may activate when the pen's tip moves out of proximity of a handwriting-task area.

Handwriting-recognition triggering can be inhibited when the pen is down in an inking position. If the pen remains up in a non-inking orientation for longer than a handwriting-recognition-trigger timeout duration, handwriting recognition may be triggered.

Handwriting-recognition triggering can also be accomplished in accordance with the invention via other systems and computer-readable media containing instructions for providing functionality that is analogous to that discussed above.

DETAILED DESCRIPTION OF THE INVENTION

Figure 1:
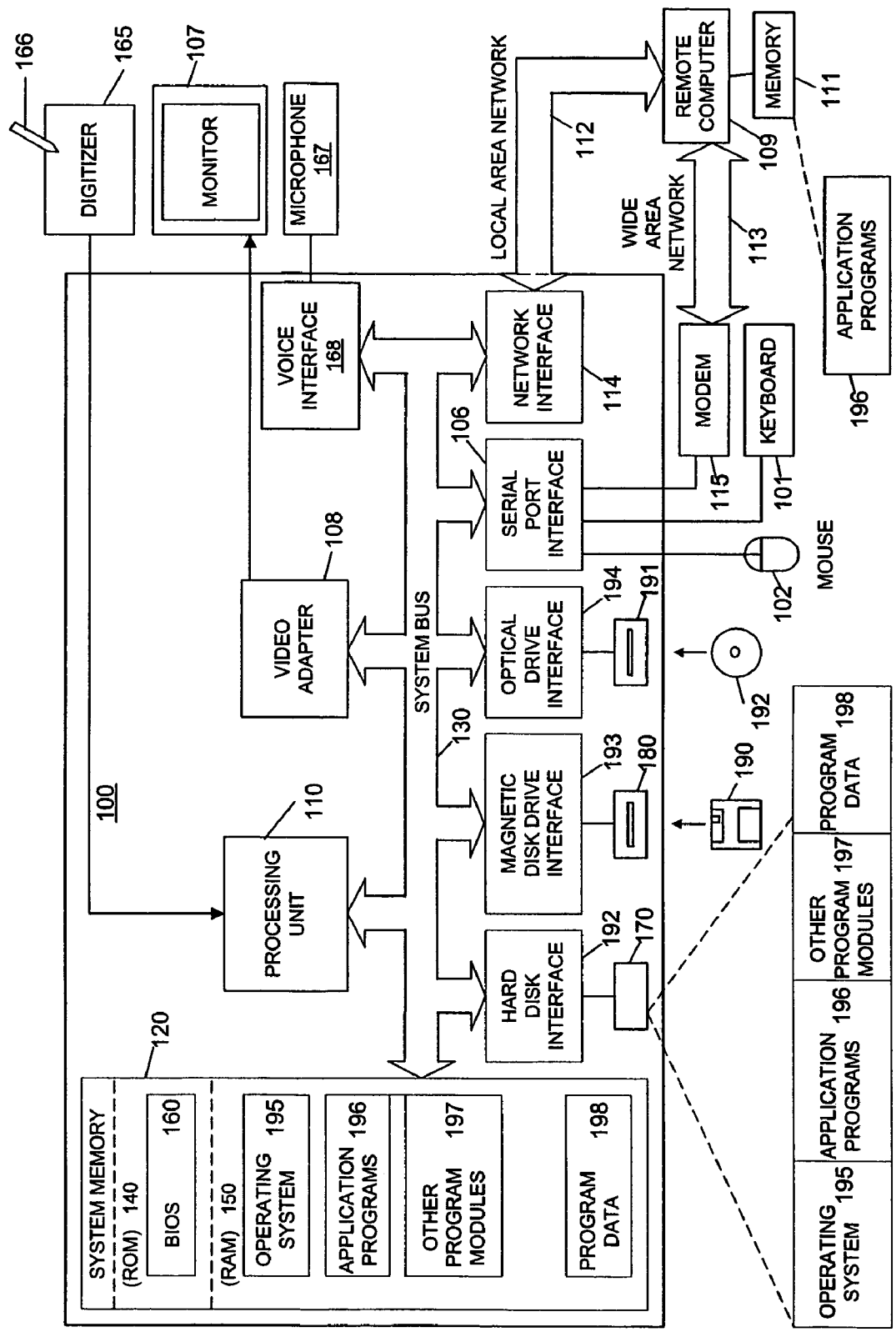
FIG. 1 is a schematic diagram showing an exemplary operating environment for practicing the invention.

The invention may be more readily described with reference to FIGS. 1-16. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device, such as computer mouse 102, or a trackball (not shown). Other input devices (not shown) may include a joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, the usable input area of the digitizer 165 may be co-extensive with the display area of the monitor 107. Further still, the digitizer 165 may be integrated in the monitor 107, or may exist as a separate device overlaying or otherwise appended to the monitor 107. Microphone 167 is coupled to the system bus via a voice interface 168 in a well-known manner.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
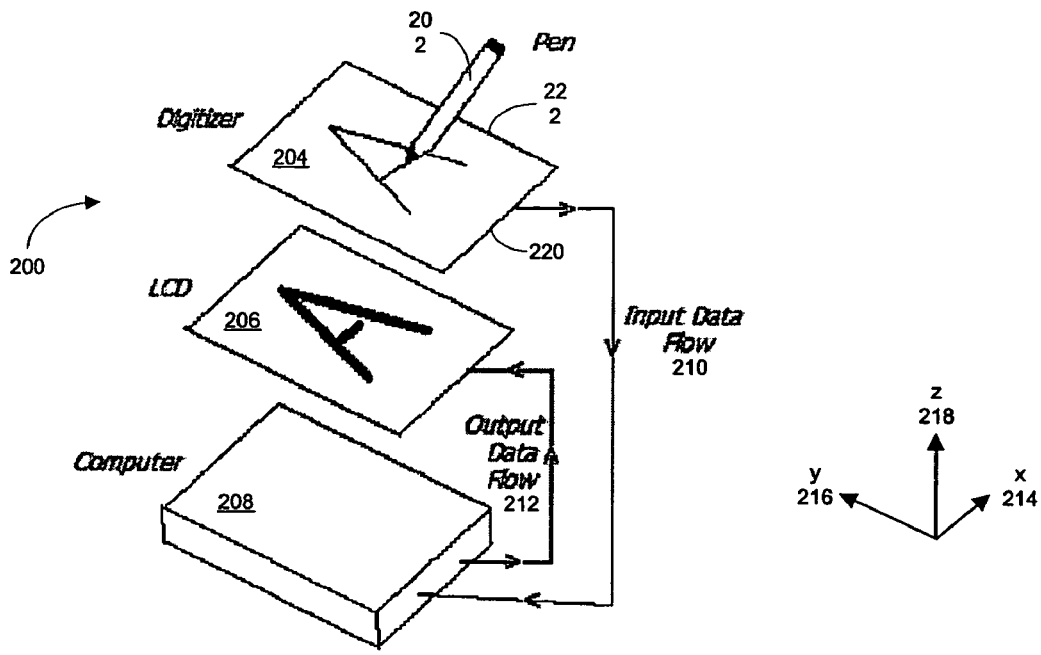
FIG. 2 is a schematic diagram of computer that can accept and display handwritten user input.

FIG. 2 illustrates a computer system 200 including a pen 202, a digitizer 204, a liquid crystal display (LCD) 206, and a computer 208, which may include any of the features, subsystems, and functions described above in connection with the computer system of FIG. 1. The digitizer 204 may be transparent. The computer 208 can display objects on the LCD 206 in a manner that is well known in the art.

A user interacts with the computer 208 by tapping or drawing on the surface of the digitizer 204 with the pen 202. The pen 202 can be any suitable pointing device whose proximity and location relative to the digitizer 204 may be determined. The pen 202 can work in a manner similar to how a conventional pointing device, such as a computer mouse 102, works. The user can write characters on the digitizer 204 with the pen 202. The digitizer transfers to the computer 208, as depicted by input data flow 210, data regarding the movement of the pen 202. The computer 208 can then record the pen's movement and send data to the LCD 206, as depicted by output data flow 212, so that recorded handwriting strokes can be displayed on the LCD 206. In this way, the pen 202, digitizer 204, computer 208, and LCD 206 can form an interaction loop that provides functionality analogous to writing with a pen on paper.

Reference will be made to x, y, and z directions and coordinates as shown in FIG. 2 by x axis 214, y axis 216, and z axis 218. The x axis 214 defines a first dimension corresponding to a width 220 of the digitizer. The y axis 216 defines a second dimension corresponding to a length 222 of the digitizer. The z axis 218 defines a third dimension corresponding to a height in a direction perpendicular the writing surface of the digitizer 204.

Figure 3:
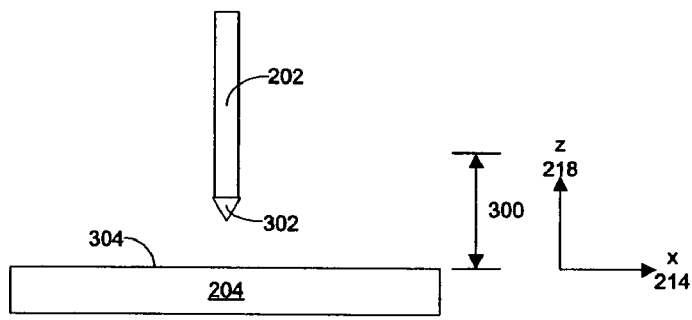
FIG. 3 is an elevational view of the digitizer and pen of FIG. 2.

FIG. 3 is an elevational view of the digitizer 204. A maximum trackable distance 300 along the z axis 218 is shown. A tip 302 of the pen 202 is shown separated from a writing surface 304 of the digitizer 204 by less than the maximum trackable distance 300 away from the digitizer's writing surface 304.

While the pen's tip 302 is in contact with the writing surface of the digitizer, the digitizer tracks the two-dimensional location of the pen 202 in a manner that is well known in the art. When the pen tip 302 is in contact with the digitizer surface 304, the z-coordinate value of the pen's location is considered to equal to 0, and the pen's location can be specified by x and y coordinates in a manner that is well known in the art. Similarly, when the pen is separated from the digitizer's writing surface 304 by less than a maximum trackable distance 300 in a direction along the z axis 218, the digitizer maps the pen's location in three-dimensions (x, y, and z) to a two-dimensional location (x and y) on the digitizer's writing surface 304. The digitizer 204 tracks the location of the pen tip 302 when z is greater than zero and less than the maximum trackable distance. Pens and digitizers providing this type of functionality are known in the art. For example, the Intuous2 tablet and the Intuous2 Grip Pen, which are available from Wacom Technology Corporation of Vancouver, Wash., provide this type of location-tracking when the pen is separated from the digitizer's writing surface.

In accordance with the foregoing discussion, the pen 202 and the digitizer 204 can operate in at least three distinct modes. First, the pen 202 can be touching the surface 304 of the digitizer 204. Second, the pen can be separated from the surface 304 by less than or equal to the maximum trackable distance 300, which can be approximately 1-2 inches, away from the surface 304. It is appreciated that the maximum trackable distance is determined by the type of materials used and may be preset or may vary based on user input. When the pen 202 is in this trackable space above the digitizer 204, the digitizer 204 tracks the movement of the pen 202, and the pen can be said to be within proximity of the digitizer 204. Third, the pen 202 can be farther away from the digitizer than the maximum trackable distance 300. When the pen 202 is farther away from the digitizer than the maximum trackable distance 300, the digitizer 204 may stop tracking the pen's location, and a cursor can be displayed in a position corresponding to where the pen went out of proximity. Alternatively, the digitizer 204 may stop mapping the pen's location onto the digitizer surface 304 while the pen 202 is out of proximity with respect to the digitizer 204.

These three modes of operation involving the pen and the digitizer may be represented in terms of the x, y, and z axes 214, 216, and 218. With respect to the location of the pen 202, in the first mode of operation, Z equals 0. In the second mode, Z is greater than 0 and less than equal to the maximum trackable distance 300. In the third mode, the z is greater than the maximum trackable distance 300.

As will be apparent to one of ordinary skill in the art, instead of using the pen 202 and digitizer 204, a mouse, such as mouse 102, may be considered as operating in the first and second modes when a mouse button is pressed and released, respectively.

Figure 4:
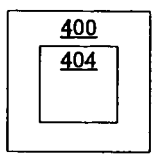
FIGS. 4-6 show handwriting-recognition task areas that either overlap to varying degrees or that do not overlap.
Figure 4:
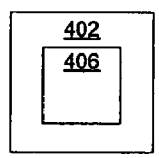

FIG. 4 shows two handwriting-recognition task areas 400 and 402, which may be located on the digitizer's writing surface 304. A user's handwriting in a single task area, which may be a series of strokes, may be considered one handwriting recognition unit. Such a handwriting recognition unit may include a sentence, an English word, a Chinese character, or the like.

Inside a task area the system may include at least one core task area, such as core task areas 404 and 406. A task area and a core task area may be coextensive. In an area of the LCD 206 corresponding to the core task area of the digitizer 206, the computer may display handwriting strokes recorded by the digitizer 204. Any part of the task area that is not part of the core task area can be referred to as a fringe portion of the task area. The task area may include a core task area without any fringe areas. Alternatively, the task area may include core task area and one or more fringe areas. Pen movement in the fringe area can be ignored by the computer so that it is not recorded as part of the stoke data and so that it is not displayed in a region of the LCD 206 corresponding to the fringe portion of the task area.

In accordance with an embodiment of the invention, the computer 208 can disregard ink that begins in a fringe portion of a task area. Once inking has started in a core task area, in addition to collecting ink data in the core task area, the computer may, or may not, also collect ink data in any fringe portion of the task area. Ink data collected from a fringe portion of the task area may, or may not, be displayed in a region of the LCD 206 corresponding to a fringe portion of the task area.

Figure 5:
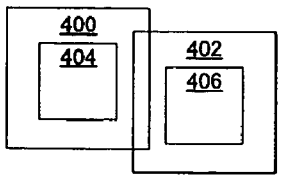
Figure 6:
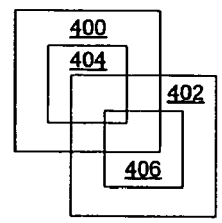

Task areas, such as task areas 400 and 402 can overlap—or not—in one of three ways. FIG. 4 shows task areas 400 and 402 that do not overlap. FIG. 5 shows task areas 400 and 402 overlapping in their respective fringe areas, but not overlapping with respect to core task areas 404 and 406. FIG. 6 shows task areas 400 and 402 overlapping with each other and core task areas 404 and 406 overlapping with each other. Although FIGS. 4-6 show task areas that are squares, task areas can have any other suitable shape, such as a polygon and any shape as desired. Pen movement can be tracked throughout multiple task areas, without differentiating between core task areas and fringe areas. When tracking movement throughout entire task areas, two cases are presented for purposes of detecting when then pen moves out of proximity from a current or first task area, such as task area 400, and moves into proximity of a next or second task area, such as task area 402: the task areas either overlap with each other or do not overlap.

The pen 202 may be considered to have moved out of proximity with a previous task area whenever the pen moves further away from the digitizer 204 than the maximum trackable distance 300. But the pen 202 can remain within proximity of the digitizer 204 with respect to the z axis 218 and can still have moved out of proximity of a previous task area with respect to the x axis 214 and/or the y axis 216. This can happen, for instance, when: (1) the pen is less than the maximum trackable distance 300 away from the digitizer surface 304; and (2) the pen's location maps to a digitizer-surface location that is outside of the previous task area.

Handwriting recognition may be triggered upon detecting that the pen has moved out of proximity from a previous task area and that the pen has been lifted off the digitizer's writing surface 304. Upon detecting both of these occurrences, handwriting-recognition can be triggered based on an inference that writing in the previous task area has been completed.

Figure 7:
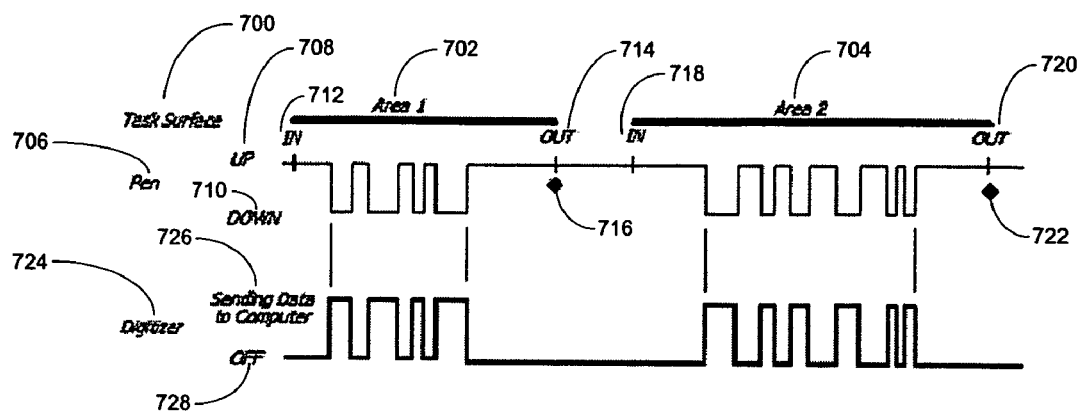
FIGS. 7-9 are timing diagrams showing when handwriting recognition can be triggered for non-overlapping task areas.
Figure 8:
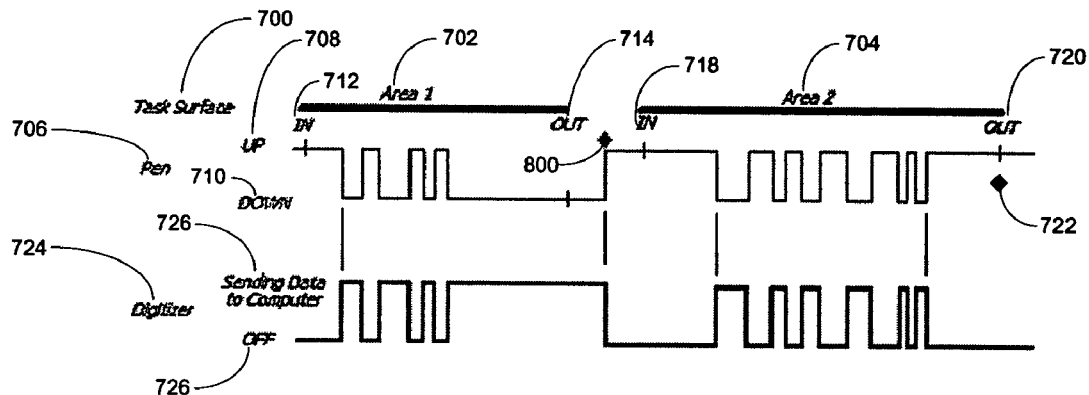
Figure 9:
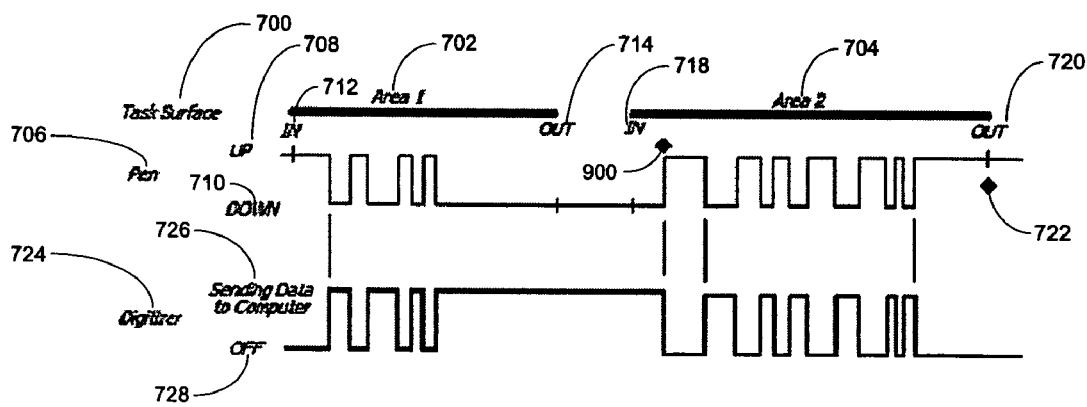

FIGS. 7-9 show, for non-overlapping task areas, triggering of handwriting recognition upon detecting that the pen has moved out of proximity from the previous task area and that the pen is up in a non-inking orientation. In these Figures, time elapses from left to right. The top line labeled Task Surface 700 shows whether the pen's location is mapping into task area 1 702 or into task area 2 704, or into neither task area, as indicated by the gap between the task area 1 and the task area 2 lines indicating that the pen's location is mapping into either area 1 or area 2. Beneath the task surface line 700, actions of the pen, as a function of time, are shown by pen signal 706. Up 708 and down 710 correspond to pen-up and pen-down conditions. Transitioning from a pen-up condition to a pen-down condition is referred to as a pen-down event. Transitioning from pen-down condition to a pen-up condition is referred to as a pen-up event.

The pen 202 enters task area 1 in the up 708 orientation or state, as indicated at 712. A sequence of four paired pen-down and pen-up events, corresponding to four handwriting strokes, then occur in task area 1, followed by the pen moving out of proximity from task area 1, as indicated at point 714. Upon detecting that pen 202 is in the up position and that the pen has moved out of task area 1, handwriting recognition is triggered for the handwriting strokes recorded in task area 1, as indicated by the diamond-shaped symbol 716. The pen 202 then enters task area 2 in the up 708 orientation, as indicated at point 718. A sequence of six paired pen-down and pen-up events, corresponding to six handwriting strokes, then occur in task area 2, followed by the pen moving out of proximity from task area 2, as indicated by label 720. Upon detecting that pen 202 is in the up position and that the pen has moved out of task area 2, handwriting recognition is triggered for the handwriting strokes recorded in task area 2, as indicated at 722. While the pen is down, the digitizer 204 sends handwriting-stroke data to the computer 208, as shown in the corresponding waveform 724 with sending and non-sending levels 726 and 728.

FIG. 8 is similar to FIG. 7. The pen 202 is down as it moves out of task area 1. Then as the pen transitions from down to up, handwriting recognition is triggered, as indicated at 800, for the handwriting stroke data from task area 1.

FIG. 9 is similar to FIG. 8. The pen 202 is down 710 as it moves out of task area 1 and into task area 2. Then, while the pen's position is mapped into task area 2 and as the pen transitions from down 710 to up 708, handwriting recognition is triggered, as indicated at 900, for the handwriting stroke data from task area 1.

Figure 10:
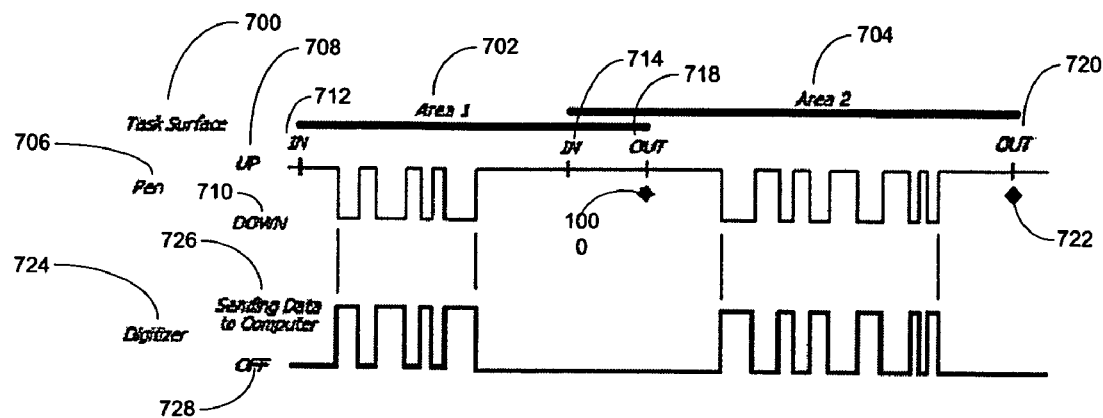
FIGS. 10-12 are timing diagrams showing when handwriting recognition can be triggered for overlapping task areas.

FIG. 10 is similar to FIG. 7 except that task areas 1 and 2 overlap each other. As a result, the pen may enter task area 2 before leaving task area 1. Handwriting recognition is triggered, as indicated at 1000, for the handwriting-stroke data from task area 1 when the pen leaves task area 1 in the up state 708.

Figure 11:
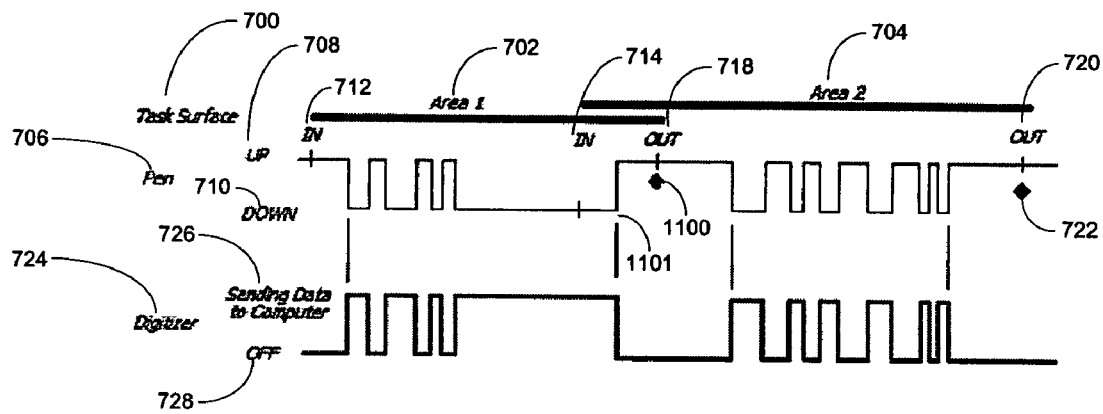

FIG. 11 is similar to FIG. 10 except that the pen enters task area 2 in the down state 710. Then, after a pen-up event 1101 occurs, upon the pen exiting task area 1 in the up state, handwriting recognition is triggered, as indicated at 1100, for the handwriting-stroke data from task area 1.

Figure 12:
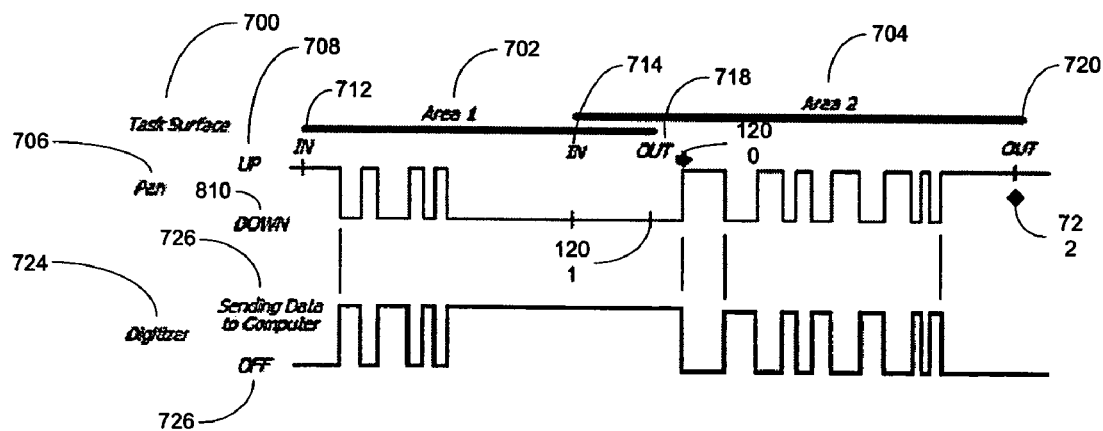

FIG. 12 is similar to FIG. 11 except that, after the pen enters task area 2 in the down state, the pen exits 1201 task area 1 in the down state. Then, upon a pen-up event occurring, handwriting recognition is triggered, as indicated at 1200, for the handwriting-stroke data from task area 1.

Figure 13:
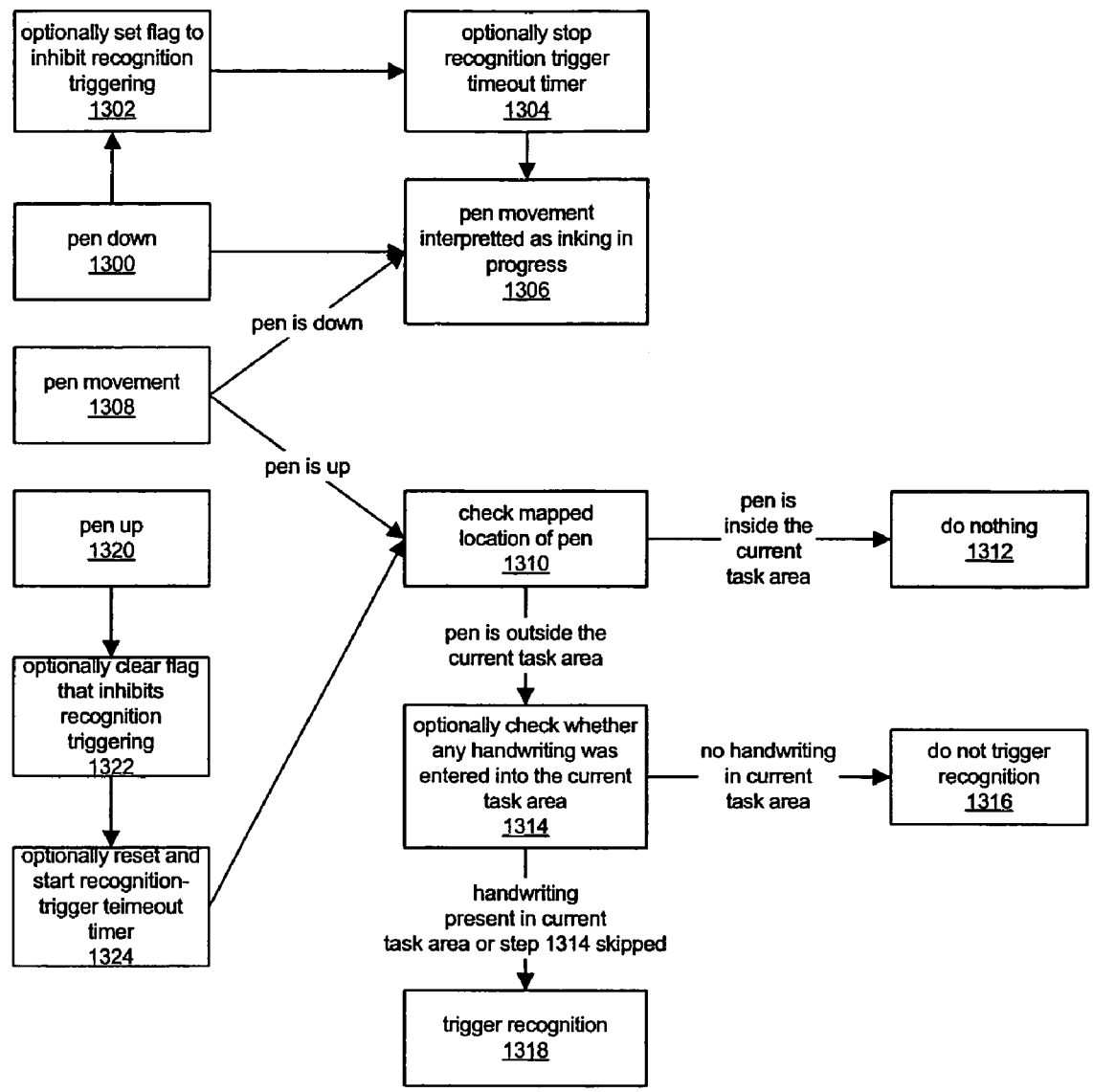
FIG. 13 is a flow diagram showing steps that can be performed by various event handlers in accordance with the invention.

Triggering of handwriting recognition may be implemented with event handlers comprising computer-executable instructions stored on a computer-readable medium. FIG. 13 is a flow diagram for handling pen-down, pen-move, and pen-up events sent to the computer 208 from the digitizer 204 in accordance with embodiments of the invention. Upon occurrence of a pen-down event, which can correspond to the pen 202 transitioning from a pen-up state to a pen-down state, an inking flag may be set to inhibit triggering of handwriting recognition while the pen is in the down state, as indicated at 1302. A timeout timer, which may trigger recognition when the pen remains in an up state longer than a predetermined duration can be stopped, as indicated at 1304, and subsequent pen movement may be interpreted as handwriting stroke data, as indicated at 1306.

Upon the occurrence of a pen-movement event, different steps are performed depending upon whether the pen is up or down. If the pen is down, pen movement is interpreted as handwriting-stroke data, as indicated at 1308 and 1306. If the pen is up, the mapped location of the pen onto the digitizer surface 304 is checked, as indicated at 1308 and 1310. If the pen is inside the current task area, no action is taken, as indicated at 1312. If the pen is outside the current task area, then a determination can be made as to whether any handwriting was entered into the current task area, as indicated at 1314. If no handwriting was entered into the current task area, then handwriting recognition is not triggered, as indicated at 1316. If handwriting was entered into the current task area or if step 1314 was skipped, then handwriting is triggered, as indicated at 1318.

Upon occurrence of a pen-up event, which can correspond to the pen 202 transitioning from a pen-down state to a pen-up state: the inking flag that inhibits triggering of handwriting recognition while the pen is in the down state can be cleared, as indicated at 1320 and 1322; a timeout timer that can trigger recognition when the pen remains in an up state longer than a predetermined duration can be reset and started, as indicated at 1324; and any of steps 1310 through 1318, discussed above can be performed.

Figure 14:
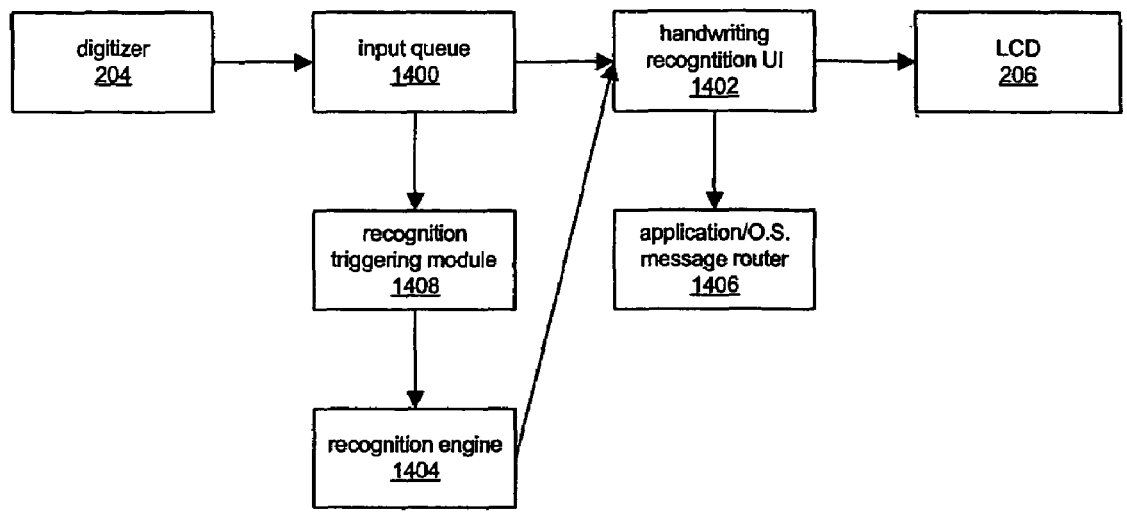
FIG. 14 is a schematic diagram showing data flow of related to triggering handwriting recognition in accordance with the invention.
Figure 15:
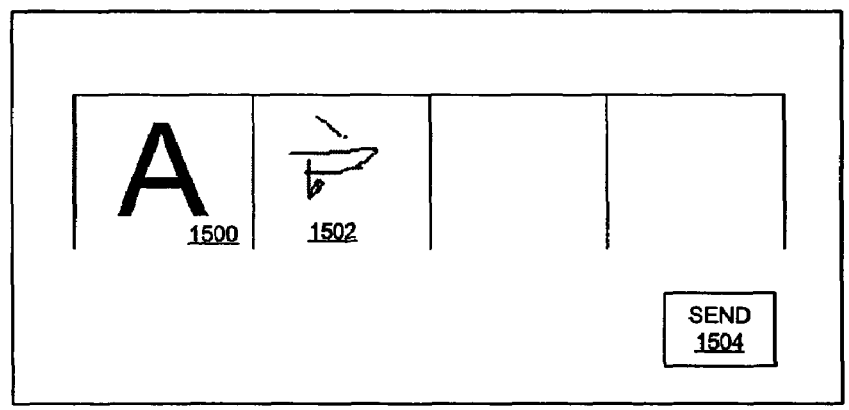
FIG. 15 shows a user interface display including a handwriting-recognition result.

FIG. 14 is a schematic diagram of data flow in accordance with the invention. Handwriting-stroke data and pen events can be passed from the digitizer 204 to an input queue 1400. The input queue 1400 then passes this data to a handwriting recognition user interface module 1402 and to a handwriting recognition triggering module 1408, which can pass data to the a handwriting recognition engine 1404, which can run as a background process. The user interface 1402 can send the handwriting stroke data from the digitizer to the LCD 206 for display in an area corresponding to a current handwriting-recognition task area. Upon determining that handwriting recognition should be triggered, the recognition-triggering module 1408 can tell the recognition engine 1404 to perform or finalize the recognition process. The recognition engine 1404 can then provide a recognition result and/or one or more alternate results to the handwriting-recognition user interface module 1402, which can then display the recognition result on the LCD in an area corresponding to the current task area in which the user entered handwriting. For example, FIG. 15, which shows writing in progress in a second task area 1502 and shows an in-place recognition result for a recognized Chinese character in a first task area 1500. Referring to FIGS. 14 and 15, the handwriting user interface 1402 can provide an end button 1504 that, when activated, will pass recognition results to an active application program or an operating system message router 1406. The end button 1504 may be located within one or more task areas, such as task areas 1500 and 1502. Instead of, or in addition to, a soft or virtual end button 1504, the pen 202 can include an end button 306 having functionality analogous to soft end button 1504.

Upon detecting that the pen 202 has moved away from the digitizer beyond the maximum trackable distance 300, completion of writing in the previous task area can be inferred. This can be referred to as a condition in which the pen has moved out of proximity from the digitizer 204. Under these circumstances, handwriting recognition can be triggered. Triggering handwriting recognition can refer to initiating handwriting recognition by the handwriting recognition engine 1404, or triggering completion of a handwriting recognition process that is already in progress.

The invention has been described with respect to various illustrative embodiments including presently preferred modes of carrying out the invention. Those skilled in the art will appreciate that there are numerous variations and permutations of the systems and techniques described above that fall within the spirit and scope of the invention as set forth in the appended claims.

We claim:

1. A system that triggers handwriting recognition, the system comprising:
   a pen-down event handler that sets an inking flag to indicate that inking has started in a handwriting-recognition task area upon a pen-down event occurring in a core task area of the handwriting-recognition task area;
   a pen-up event handler that clears the inking flag to indicate that inking is not in progress upon occurrence of a pen-up event; and
   a pen-movement event handler that, while the inking flag is cleared and upon a pen-movement event occurring, triggers handwriting recognition upon determining that a pen's mapped location on a writing surface has moved outside of the handwriting-recognition task area.

2. The system of claim 1, wherein the pen-movement-event handler does not trigger handwriting recognition when handwriting is not present in the handwriting-recognition task area.

3. The system of claim 1, wherein the pen-up event handler activates a handwriting-recognition-timeout period that, upon elapsing, triggers handwriting recognition.

4. The system of claim 1, wherein the pen-down event handler inhibits triggering of handwriting recognition while inking is in progress in the handwriting-recognition task area.

5. A system that triggers handwriting recognition, the system comprising:
   a pen-down event handler that sets an inking flag to indicate that inking has started in a handwriting-recognition task area upon a pen-down event occurring in a core task area of the handwriting-recognition task area; and
   a pen-up event handler that, upon an occurrence of a pen-up event, clears the inking flag to indicate that inking is not in progress and that, while the inking flag is cleared, triggers handwriting recognition upon determining that the pen is up and that the pen's mapped location on the writing surface has moved outside of the handwriting-recognition task area.

6. The system of claim 5, wherein the pen-up event handler does not trigger handwriting recognition when handwriting is not present in the handwriting-recognition task area.

7. The system of claim 6, wherein the pen-up event handler activates a handwriting-recognition-timeout period that, upon elapsing, triggers handwriting recognition.

8. A computer-readable medium containing computer-executable instructions for triggering handwriting-recognition by performing steps comprising:
   determining that a pen is down in an inking state;
   determining that the pen's mapped location on a writing surface is located within a first handwriting-recognition task area;
   determining that the pen has moved up thereby transitioning from the inking state to a non-inking state; and
   while the pen is up in the non-inking state, triggering handwriting recognition for handwriting entered in the first task area upon determining that the pen's mapped location on the writing surface has moved out of the first task area.

9. The computer-readable medium of claim 8 containing further computer-executable instructions for performing steps comprising:
   not triggering handwriting recognition when handwriting is not present in the first handwriting-recognition task area.

10. The computer-readable medium of claim 8 containing further computer-executable instructions for performing steps comprising:
    upon determining that the pen has transitioned to the non-inking state, activating a handwriting-recognition-timeout period that, upon elapsing, triggers handwriting recognition.

11. The computer-readable medium of claim 8 containing further computer-executable instructions for performing steps comprising:
    upon determining that the pen is down in an inking state, inhibiting triggering of handwriting recognition for the first handwriting recognition area while the pen remains in the inking state.

* * * * *